(12) United States Patent
Nagasaka et al.

(10) Patent No.: US 10,477,430 B2
(45) Date of Patent: Nov. 12, 2019

(54) RADIO TERMINAL

(71) Applicant: KYOCERA CORPORATION, Kyoto (JP)

(72) Inventors: Yushi Nagasaka, Ritto (JP); Masato Fujishiro, Yokohama (JP); Kugo Morita, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/747,492

(22) PCT Filed: Jul. 29, 2016

(86) PCT No.: PCT/JP2016/072433
§ 371 (c)(1),
(2) Date: Jan. 25, 2018

(87) PCT Pub. No.: WO2017/018538
PCT Pub. Date: Feb. 2, 2017

(65) Prior Publication Data
US 2018/0220326 A1    Aug. 2, 2018

Related U.S. Application Data

(60) Provisional application No. 62/198,937, filed on Jul. 30, 2015.

(51) Int. Cl.
*H04W 28/02*    (2009.01)
*H04W 24/10*    (2009.01)
(Continued)

(52) U.S. Cl.
CPC ....... *H04W 28/0278* (2013.01); *H04W 24/10* (2013.01); *H04W 72/0413* (2013.01); *H04W 88/02* (2013.01)

(58) Field of Classification Search
CPC ......... H04W 28/0278; H04W 72/0413; H04W 88/02; H04W 72/1284; H04W 76/10; H04W 72/1268; H04W 24/10
See application file for complete search history.

(56) References Cited

U.S. PATENT DOCUMENTS

2003/0156565 A1*  8/2003  Taisto ...................... H04Q 9/00
                                                        370/338
2009/0252089 A1* 10/2009  Lim ....................... H04L 1/1614
                                                        370/328
(Continued)

OTHER PUBLICATIONS

International Search Report issued in PCT/JP2016/072433; dated Sep. 20, 2016.
(Continued)

*Primary Examiner* — Anez C Ebrahim
(74) *Attorney, Agent, or Firm* — Studebaker & Brackett PC (57) ABSTRACT

A radio terminal according to one embodiment transmits data of one bearer to two radio communication apparatuses. The radio terminal comprises a controller configured to transmit a buffer status report to only one of the two radio communication apparatuses, if a data amount accumulated in a predetermined buffer falls below a threshold value and only the one radio communication apparatus is designated as a transmission target of the buffer status report. The controller is configured to change the transmission target of the buffer status report from the one radio communication apparatus to the other radio communication apparatus, if the data amount falls below the threshold value and a failure in a radio link with the one radio communication apparatus is detected.

8 Claims, 9 Drawing Sheets

(51) Int. Cl.
*H04W 72/04* (2009.01)
*H04W 88/02* (2009.01)

(56) References Cited

U.S. PATENT DOCUMENTS

| | | | | |
|---|---|---|---|---|
| 2015/0017974 A1* | 1/2015 | Aoyagi | ................ | H04W 76/30 |
| | | | | 455/422.1 |
| 2015/0124598 A1* | 5/2015 | Jang | ................ | H04W 72/0413 |
| | | | | 370/230 |
| 2016/0050605 A1* | 2/2016 | Kim | ................ | H04W 28/08 |
| | | | | 370/331 |
| 2016/0088647 A1* | 3/2016 | Yi | ................ | H04W 72/1205 |
| 2016/0112910 A1* | 4/2016 | Agiwal | ................ | H04W 76/14 |
| | | | | 370/331 |
| 2016/0150440 A1* | 5/2016 | Lee | ................ | H04W 28/0278 |
| | | | | 455/422.1 |
| 2017/0111927 A1* | 4/2017 | Kim | ................ | H04W 28/0278 |

OTHER PUBLICATIONS

Intel Corporation; BSR Transmission for Dual Connected UEs; 3GPP TSG-RAN2 Meeting #85Bis; R2-141204; Mar. 31-Apr. 4, 2014; 3 pages; Valencia, Spain.

Kyocera; PDCP PDU delivery for uplink split bearer; 3GPP TSG-RAN WG2 #90; R2-152640; May 25-29, 2015; 3 pages; Fukuoka, Japan.

Huawei et al.; Enhancement of LCP procedure for UL split bearer; 3GPP TSG-RAN WG2 Meeting #85bis; R2-141154; Mar. 31-Apr. 4, 2014; 3 pages; Valencia, Spain.

Panasonic; BSR Reporting Options for Dual Connectivity; 3GPP TSG RAN WG2 #85; R2-140475; Feb. 10-14, 2014; 3 pages; Prague, Czech Republic.

* cited by examiner

RADIO TERMINAL

TECHNICAL FIELD

The present invention relates to a radio terminal in a mobile communication system.

BACKGROUND ART

In 3GPP (3rd Generation Partnership Project) which is a project aiming to standardize a mobile communication system, dual connectivity communication in which a radio terminal communicates with two base stations has been specified. The dual connectivity communication is a communication mode in which a master cell group (MCG) and a secondary cell group (SCG) are set to a radio terminal in an RRC (Radio Resource Control) connected mode. The MCG is a serving cell group managed by a master base station. The SCG is a serving cell group managed by a secondary base station.

SUMMARY OF THE INVENTION

A radio terminal according to one embodiment transmits data of one bearer to two radio communication apparatuses. The radio terminal comprises a controller configured to transmit a buffer status report to only one of the two radio communication apparatuses, if a data amount accumulated in a predetermined buffer falls below a threshold value and only the one radio communication apparatus is designated as a transmission target of the buffer status report. The controller is configured to change the transmission target of the buffer status report from the one radio communication apparatus to the other radio communication apparatus, if the data amount falls below the threshold value and a failure in a radio link with the one radio communication apparatus is detected.

DESCRIPTION OF THE EMBODIMENT

Overview of the Embodiments

A radio terminal transmits data of one bearer to two radio communication apparatuses. The radio terminal comprises a controller configured to transmit a buffer status report to only one of the two radio communication apparatuses, if a data amount accumulated in a predetermined buffer falls below a threshold value and only the one radio communication apparatus is designated as a transmission target of the buffer status report. The controller is configured to change the transmission target of the buffer status report from the one radio communication apparatus to the other radio communication apparatus, if the data amount falls below the threshold value and a failure in a radio link with the one radio communication apparatus is detected.

In an embodiment to be described later, an example in which "one bearer" is a split bearer, "two radio communication apparatuses" are a master base station and a secondary base station, and "predetermined buffer" is a buffer of a PDCP entity. "Split bearer" is a bearer that uses the resources of both the master base station and the secondary base station, with corresponding radio protocols present in both the master base station and the secondary base station.

In the first embodiment, the controller is configured to change the transmission target of the buffer status report from the first radio communication apparatus to the second radio communication apparatus, and change the transmission target of the data from the first radio communication apparatus to the second radio communication apparatus.

In the first embodiment, the other radio communication apparatus is a master base station configured to manage a master cell group. The one radio communication apparatus is a secondary base station configured to manage a secondary cell group.

A radio terminal according to a second embodiment transmits data of a plurality of bearers to two radio communication apparatuses. The radio terminal comprises a controller including two transmission entities corresponding to the two radio communication apparatuses and a higher entity located at a higher layer than the two transmission entities. If an uplink radio resource is allocated to the radio terminal from one of the two radio communication apparatuses, the higher entity preferentially delivers data of a bearer with a higher priority, to a transmission entity corresponding to the one radio communication apparatus.

In an embodiment to be described later, an example will be described in which "a plurality of bearers" includes at least one split bearer. Further, in the embodiment to be described later, an example will be described in which "transmitting entity" is an RLC entity and "upper entity" is PDCP entity. However, the "transmitting entity" may include a MAC entity or the like.

In the second embodiment, the higher entity performs a priority setting on the plurality of bearers.

In the second embodiment, the two radio communication apparatuses include a master base station configured to manage a master cell group. The higher entity performs the priority setting, based on a setting parameter notified from the master base station.

In the second embodiment, the higher entity performs the priority setting, based on a data amount for each bearer accumulated in a buffer of the higher entity.

In the second embodiment, the higher entity performs the priority setting, based on a priority applied to a logical channel corresponding to each of the plurality of bearers.

In the second embodiment, the higher entity preferentially delivers data of a bearer with the priority being high, according to a notification based on a priority setting for the plurality of bearers from another entity.

In the second embodiment, the another entity is a lower entity included in the transmission entity. Here, the lower entity may be a MAC entity.

A radio terminal according to a third embodiment transmits data of one bearer to two radio communication apparatuses. The radio terminal comprises a controller including two transmission entities corresponding to the two radio communication apparatuses and a higher entity located at a higher layer than the two transmission entities. The controller is configured to perform a process of transmitting a buffer status report indicating a total of a data amount accumulated in a buffer of a corresponding transmission entity and a data amount accumulated in a buffer of the higher entity, on at least one of the two radio communication apparatuses. The controller is configured to notify at least one of the two radio communication apparatuses of predetermined information for determining the data amount accumulated in the buffer of the higher entity.

In the third embodiment, the controller is configured to notify, as the predetermined information, information indicating a scheme of delivering, by the higher entity, the data to any one of the transmission entities. The scheme is one of a buffer accumulation type-scheme in which the data is delivered depending on an uplink radio resource allocation, and an instantaneous type-scheme in which the data is delivered even if there is no uplink radio resource allocation.

In the third embodiment, the controller is configured to notify, as the predetermined information, information indicating a ratio between a data amount accumulated in a buffer of the corresponding transmission entity and a data amount accumulated in a buffer of the higher entity.

In the third embodiment, the controller is configured to notify, as the predetermined information, information indicating the data amount accumulated in the buffer of the higher entity.

A radio terminal according to a modification of the third embodiment transmits data of one bearer to two radio communication apparatuses. The radio terminal comprises a controller including two transmission entities corresponding to the two radio communication apparatuses and a higher entity located at a higher layer than the two transmission entities. The controller is configured to performs a process of transmitting a buffer status report indicating a total of a data amount accumulated in a buffer of a corresponding transmission entity and a data amount accumulated in a buffer of the higher entity, on each of the two radio communication apparatuses. The controller is configured to transmit the buffer status report in response to a trigger that the data amount accumulated in the buffer of the higher entity falls below a predetermined amount.

A radio terminal according to a fourth embodiment transmits data of one bearer to two radio communication apparatuses. The radio terminal comprises a controller including two transmission entities corresponding to the two radio communication apparatuses and a higher entity located at a higher layer than the two transmission entities. The controller is configured to perform a process of transmitting a buffer status report indicating a total of a data amount accumulated in a buffer of a corresponding transmission entity and a data amount accumulated in a buffer of the higher entity, on each of the two radio communication apparatuses. The controller is configured to notify at least one of the two radio communication apparatuses of information indicating that there is no data to be transmitted, if there is no data to be transmitted for the bearer.

In the fourth embodiment, the controller is configured to: during transmitting last data to any one of the two radio communication apparatuses or after transmitting the last data, even if not receiving transmission acknowledge information corresponding to the last data, notify information indicating that there is no data to be transmitted.

In the fourth embodiment, the controller is configured to after transmitting last data to any one of the two radio communication apparatuses, use a radio resource different from a radio resource allocated for data transmission to notify information indicating that there is no data to be transmitted.

Mobile Communication System According to Embodiments

Hereinafter, an LTE system which is a mobile communication system according to the embodiments will be described.

(System Configuration)

Figure 1:
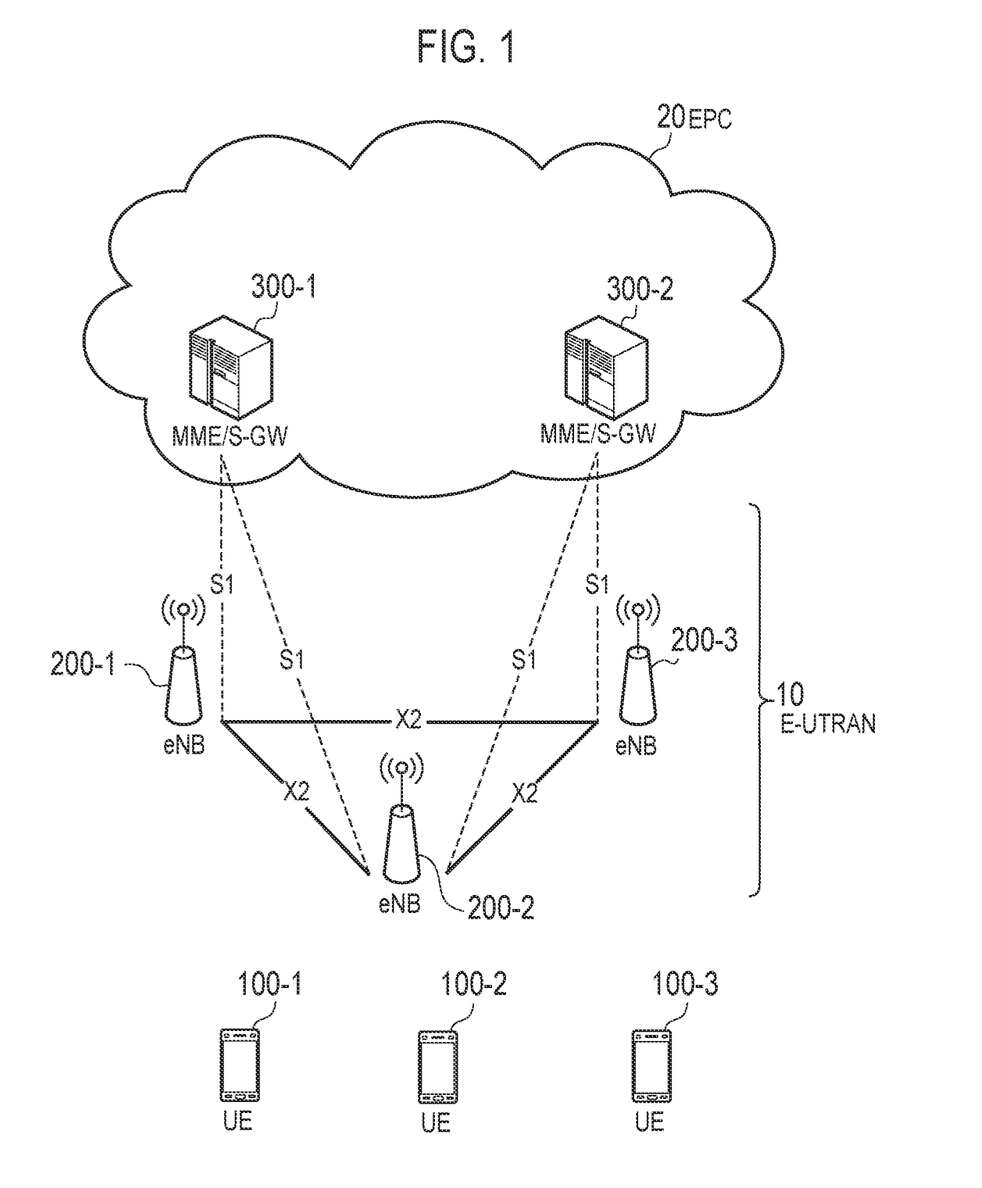
FIG. 1 is a diagram illustrating a configuration of a mobile communication system according to an embodiment.

FIG. 1 is a configuration diagram of an LTE system.

As illustrated in FIG. 1, the LTE (Long Term Evolution) system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereafter, referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

(Configuration of Radio Protocol)

Figure 2:
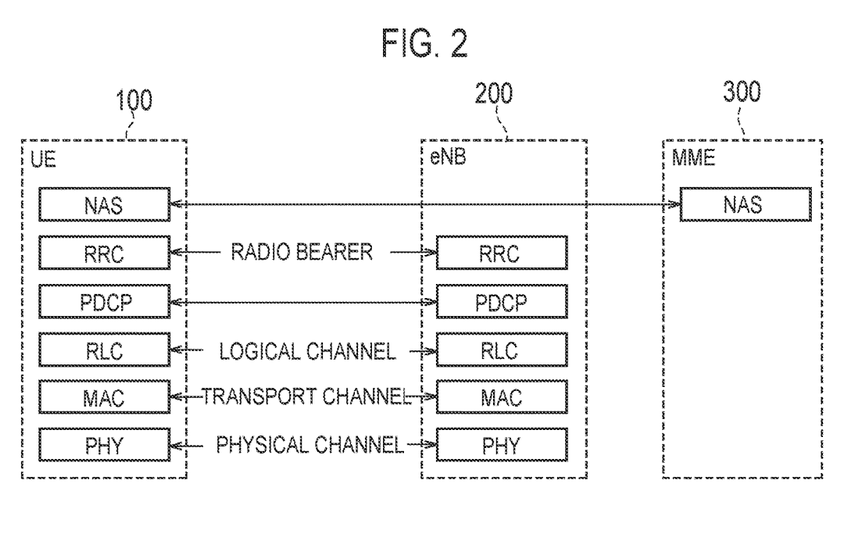
FIG. 2 is a protocol stack diagram of a radio interface in an LTE system.

FIG. 2 is a protocol stack diagram of a radio interface in the LTE system.

As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), a random access procedure, and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, messages (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode (a connected mode), otherwise the UE 100 is in an RRC idle mode (an idle mode).

A NAS (Non-Access Stratum) layer positioned above the RRC layer performs a session management, a mobility management and the like.

(Configuration of Radio Terminal)

Figure 3:
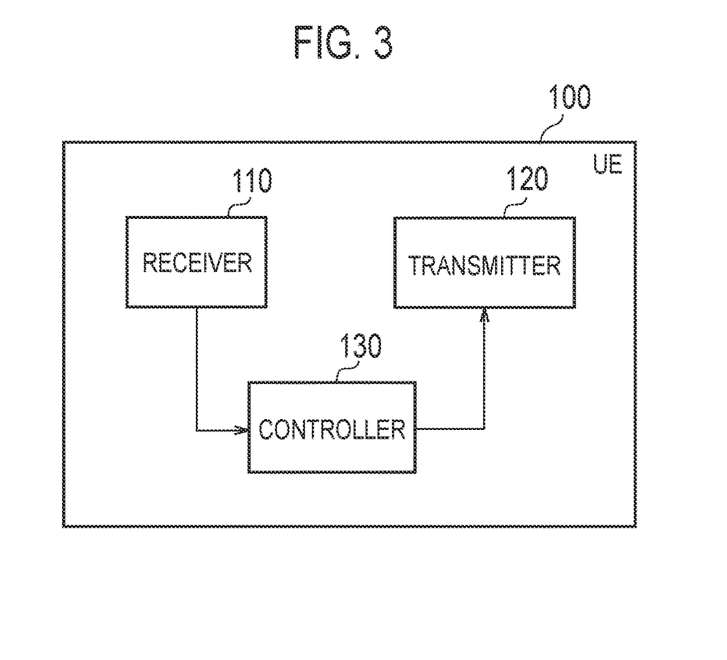
FIG. 3 is a block diagram of a UE (radio terminal) according to the embodiment.

FIG. 3 is a block diagram of the UE 100 (radio terminal) according to the embodiments. As illustrated in FIG. 3, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor may include a codec that performs encoding and decoding on sound and video signals. The processor executes the above-described various communication protocols and below-described processes.

(Configuration of Base Station)

Figure 4:
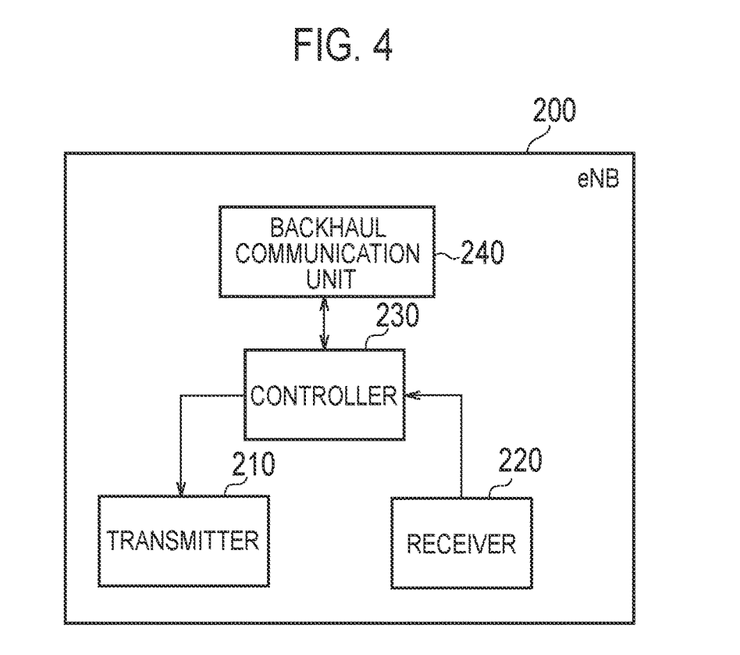
FIG. 4 is a block diagram of an eNB (base station) according to the embodiment.

FIG. 4 is a block diagram of the eNB 200 (base station) according to the embodiments. As illustrated in FIG. 4, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes the above-described various communication protocols and below-described processes.

The backhaul communication unit 240 is connected to a neighboring eNB via the X2 interface and is connected to the MME/S-GW 300 via the S1 interface. The backhaul communication unit 240 is used for communication performed on the X2 interface, communication performed on the S1 interface, and the like.

Dual Connectivity Communication According to Embodiment

Figure 5:
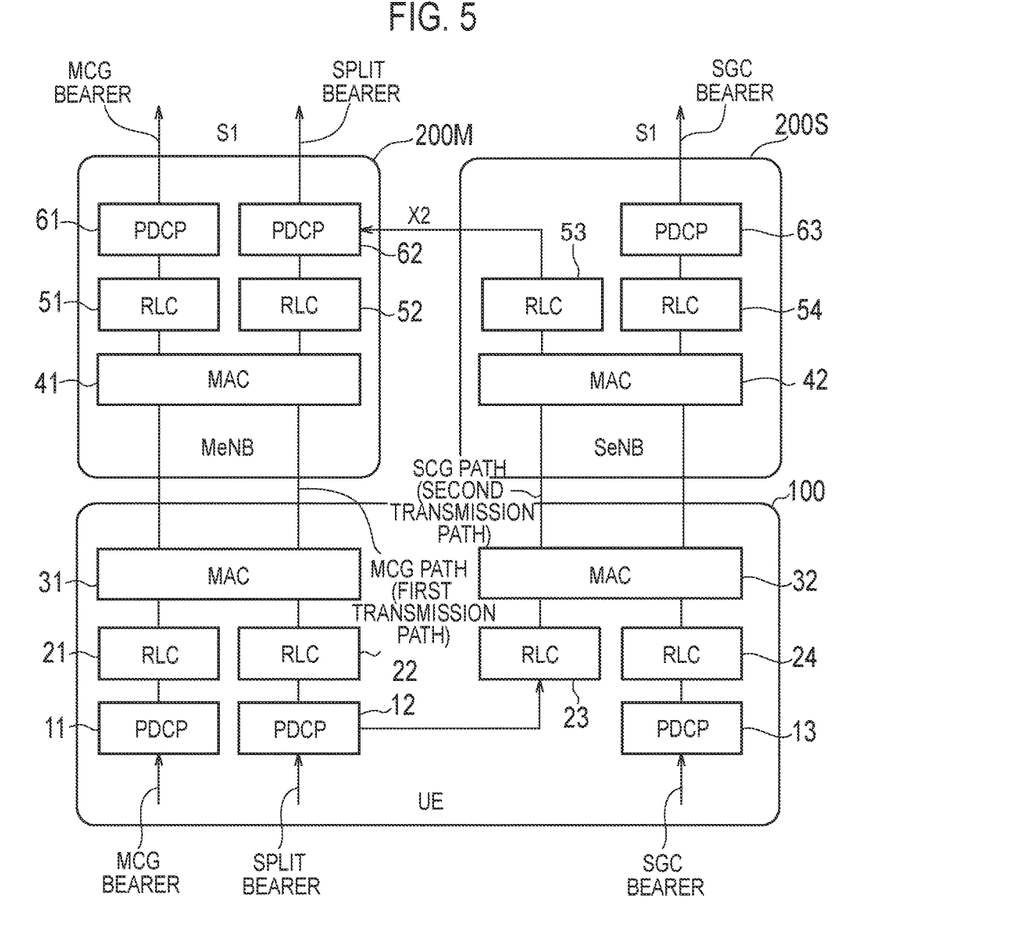
FIG. 5 is a diagram illustrating dual connectivity communication in an uplink according to the embodiment.

FIG. 5 is a diagram illustrating dual connectivity communication in the uplink according to the embodiment. It is noted that FIG. 5 illustrates a protocol stack of a user plane. Further, in FIG. 5, illustration of an entity of the physical layer is omitted.

As illustrated in FIG. 5, the dual connectivity communication is a communication mode in which a master cell group (MCG) and a secondary cell group (SCG) are set to the UE 100 in the RRC connected mode. The MCG is a serving cell group managed by an MeNB 200M (master base station). The SCG is a serving cell group managed by an SeNB 200S (secondary base station). The UE 100 is connected to the MeNB 200M and the SeNB 200S, and allocated with a resource by each of a scheduler of the MeNB 200M and a scheduler of the SeNB 200S. In the embodiment, the MeNB 200M (master base station) corresponds to a first radio communication apparatus, and the SeNB 200S (secondary base station) corresponds to a second radio communication apparatus.

The MeNB 200M has the RRC connection with the UE 100, and can transmit and receive an RRC message to and from the UE 100. The SeNB 200S does not have the RRC connection with the UE 100, and cannot transmit and receive an RRC message to and from the UE 100. For example, the MeNB 200M may be a macro cell base station, and the SeNB 200M may be a small cell base station.

The MeNB 200M and the SeNB 200S are connected mutually via the X2 interface. Each of the MeNB 200M and the SeNB 200S is connected to an S-GW via the S1 interface (S1-U interface). The MeNB 200M is connected to the MME via the S1 interface (S1-MME interface).

In the dual connectivity communication, a total of three types of bearers (data bearers), that is, an MCG bearer, an SCG bearer, and a split bearer, are defined. The MCG bearer is a bearer in which a corresponding radio protocol is present only in the MeNB 200M and which uses only a resource of the MeNB 200M. The SCG bearer is a bearer in which a corresponding radio protocol is present only in the SeNB 200S and which uses only a resource of the SeNB 200S. The split bearer is a bearer in which a corresponding radio protocol is present in both the MeNB 200M and the SeNB 200M and which uses resources of both the MeNB 200M and the SeNB 200S.

Data of the MCG bearer is processed in order of a PDCP entity 11, an RLC entity 21, and a MAC entity 31 of the UE 100, and transmitted to the MeNB 200M. The data of the MCG bearer is processed in order of a MAC entity 41, an RLC entity 51, and a PDCP entity 61 of the MeNB 200M, and transferred to the S-GW.

Data of the SCG bearer is processed in order of a PDCP entity 13, an RLC entity 24, and a MAC entity 32 of the UE 100, and transmitted to the SeNB 200S. The data of the SCG bearer is processed in order of a MAC entity 42, an RLC entity 54, and a PDCP entity 63 of the SeNB 200S, and transferred to the S-GW.

Data of the split bearer is distributed, in the PDCP entity 12 of the UE 100, to an RLC entity 22 for the MeNB 200M (MCG) and an RLC entity 23 for the SeNB 200S (SCG). Specifically, the PDCP entity 12 converts a PDCP SDU (Service Data Unit) into a PDCP PDU (Protocol Data Unit), and distributes each of the PDCP PDU to either one of the RLC entity 22 and the RLC entity 23 (routing). In other words, the PDCP entity 12 distributes the data of the split bearer to a first transmission path for performing transmission to the MeNB 200M (hereinafter, referred to as "MCG path") and a second transmission path for performing transmission to the SeNB 200M (hereinafter, referred to as "SCG path").

In the MCG path, the RLC entity 22 receives the PDCP PDU distributed by the PDCP entity 12 as an RLC SDU, converts the RLC SDU into an RLC PDU, and outputs the RLC PDU to the MAC entity 31. The MAC entity 31 receives the RLC PDU output from the RLC entity 22 as a MAC SDU, converts the MAC SDU into a MAC PDU, and transmits the MAC PDU to the MeNB 200M via a physical layer entity (not illustrated).

In the SCG path, the RLC entity 23 receives the PDCP PDU distributed by the PDCP entity 12 as an RLC SDU, converts the RLC SDU into an RLC PDU, and outputs the RLC PDU to the MAC entity 32. The MAC entity 32 receives the RLC PDU output from the RLC entity 23 as a MAC SDU, converts the MAC SDU into a MAC PDU, and transmits the MAC PDU to the SeNB 200S via the physical layer entity (not illustrated).

Further, in the SCG path, the MAC entity 42 of the SeNB 200S receives the MAC PDU via the physical layer entity (not illustrated), converts the MAC PDU into an MAC SDU, and outputs the MAC SDU to an RLC entity 53. The RLC entity 53 receives the MAC SDU output from the MAC entity 42 as an RLC PDU, converts the RLC PDU into an RLC SDU, and outputs the RLC SDU to a PDCP entity 62 of the MeNB 200M via the X2 interface.

On the other hand, in the MCG path, the MAC entity 42 of the MeNB 200M receives the MAC PDU via the physical layer entity (not illustrated), converts the MAC PDU into a MAC SDU, and outputs the MAC SDU to an RLC entity 52. The RLC entity 52 receives the MAC SDU output from the MAC entity 41 as an RLC PDU, converts the RLC PDU into an RLC SDU, and outputs the RLC SDU to the PDCP entity 62.

The PDCP entity 62 receives the RLC SDU output from the RLC entity 52 of the MeNB 200M as a PDCP PDU (MCG path), while receiving the RLC SDU output from the RLC entity 53 of the SeNB 200S as a PDCP PDU (SCG path). The PDCP entity 62 performs a reordering process (that is, PDCP reordering) of the PDCP PDU (MCG path) and the PDCP PDU (SCG path), while converting the PDCP PDU into a PDCP SDU.

First Embodiment

A first embodiment will be described, below. The first embodiment is an embodiment relating to a buffer status report of the split bearer.

The UE 100 according to the first embodiment transmits data of one bearer (split bearer) to the two eNBs 200 (the MeNB 200M and the SeNB 200S). The UE 100 includes a controller 130 configured to perform a process of transmitting the buffer status report to only one eNB 200 if a data amount accumulated in a predetermined buffer (buffer of the PDCP entity 12) falls below a threshold value and the one eNB 200 (the SeNB 200S) is designated as a transmission target of the buffer status report. The controller 130 changes the transmission target of the buffer status report from the one eNB 200 to the other eNB 200 (the MeNB 200M) if a data amount accumulated in a predetermined buffer falls below a threshold value and a radio link failure with the one eNB 200 is detected. Further, the controller 130 changes the transmission target of the buffer status report from the one eNB 200 to the other eNB 200, and changes a transmission target of the data from the one eNB 200 to the other eNB 200.

(Buffer Status Report of Split Bearer)

Figure 6:
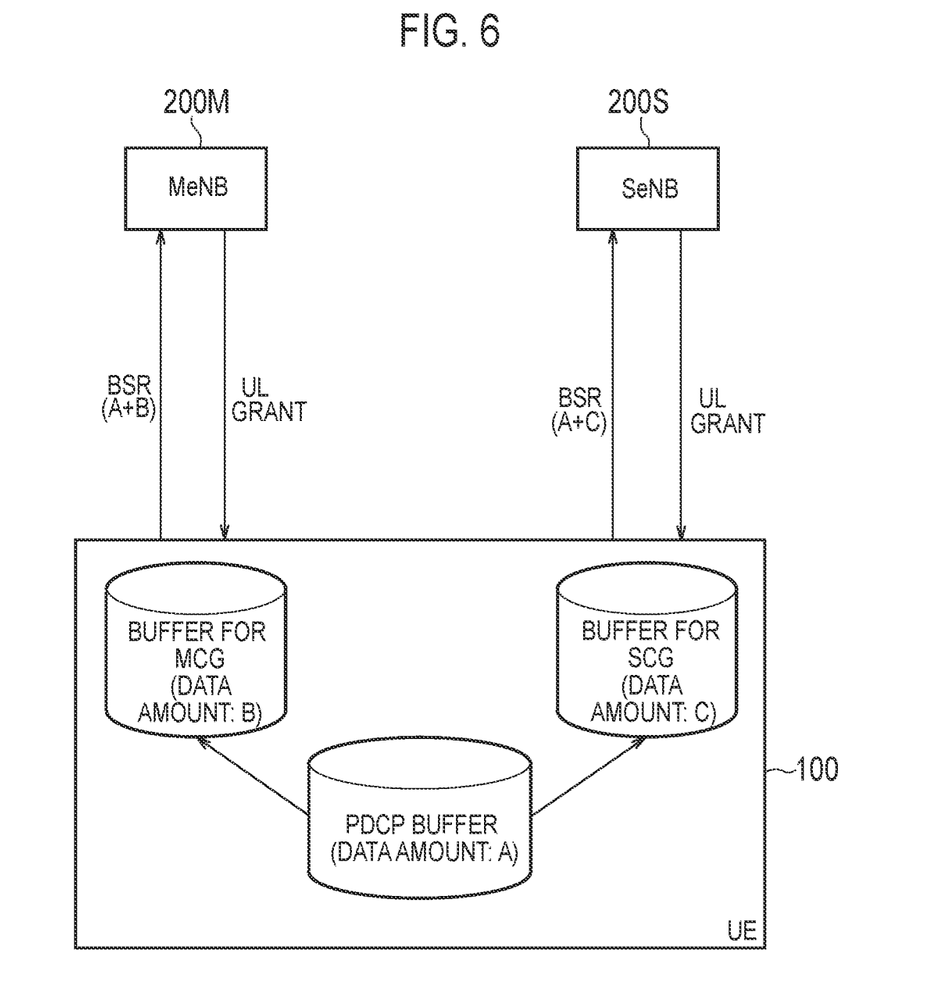
FIG. 6 is a diagram illustrating a BSR of a split bearer according to the embodiment.

The buffer status report (BSR) of the split bearer according to the first embodiment will be described. FIG. 6 is a diagram illustrating the BSR of the split bearer according to the first embodiment.

As illustrated in FIG. 6, the UE 100 includes a PDCP buffer, a buffer for MCG, and a buffer for SCG, as a buffer for accumulating the data of the split bearer. The PDCP buffer is a buffer of the PDCP entity 12. The buffer for MCG is a buffer of the RLC entity 22 (RLC buffer). The buffer for MCG (RLC buffer) may include a buffer of the MAC entity 22. The buffer for SCG is a buffer of the RLC entity 23 (RLC buffer). The buffer for SCG (RLC buffer) may include a buffer of the MAC entity 32.

A "Double BSR" scheme is applied to the BSR of the split bearer.

Specifically, if a data amount (PDCP data amount A) accumulated in the PDCP buffer exceeds a threshold value, the UE 100 transmits a BSR to both the MeNB 200M (MCG) and the SeNB 200S (SCG). The threshold value is set for each bearer by an RRC signaling transmitted by the MeNB 200M to the UE 100, for example. Further, if the data amount (PDCP data amount A) accumulated in the PDCP buffer exceeds a threshold value, the UE 100 may transmit the data of the split bearer to both the MeNB 200M (MCG) and the SeNB 200S (SCG).

The BSR transmitted by the UE 100 to the MeNB 200M indicates a total (A+B) of the data amount (PDCP data amount A) accumulated in the PDCP buffer and the data amount (data amount B) accumulated in the buffer for MCG. On the other hand, the BSR transmitted by the UE 100 to the SeNB 200S indicates a total (A+C) of the data amount (PDCP data amount A) accumulated in the PDCP buffer and the data amount (data amount C) accumulated in the buffer for SCG.

Further, if the data amount (PDCP data amount A) accumulated in the PDCP buffer falls below the threshold value, the UE 100 transmits the BSR to only one designated eNB out of the MeNB 200M and the SeNB 200S. The one eNB is set by an RRC signaling transmitted by the MeNB 200M to the UE 100, for example. Further, if the data amount (PDCP data amount A) accumulated in the PDCP buffer falls below the threshold value, the UE 100 transmits the data of the split bearer to only one designated eNB out of the MeNB 200M and the SeNB 200S.

The MeNB 200M receives the BSR (A+B) from the UE 100, and allocates, to the UE 100, an uplink radio resource, based on the received BSR. Specifically, the MeNB 200M allocates, to the UE 100, a PUSCH resource having an amount corresponding to the data amounts A+B, based on the BSR. Further, the MeNB 200M transmits, to the UE 100, resource allocation information (UL grant) indicating the allocated radio resource. The UE 100 uses the allocated radio resource to transmit the data of the split bearer to the MeNB 200M.

The SeNB 200S receives the BSR (A+C) from the UE 100, and allocates, to the UE 100, an uplink radio resource, based on the received BSR. Specifically, the SeNB 200S allocates, to the UE 100, a PUSCH resource having an amount corresponding to the data amounts A+C, based on the BSR. Further, the SeNB 200S transmits, to the UE 100, resource allocation information (UL grant) indicating the allocated radio resource. The UE 100 uses the allocated radio resource to transmit the data of the split bearer to the SeNB 200S.

Operation According to First Embodiment

A case is assumed where the data amount (PDCP data amount A) accumulated in the PDCP buffer falls below a threshold value and the SeNB 200S is designated as a transmission target of a BSR (and the data) at that time.

Assumption is made, under this circumstance, that the UE 100 detects a failure in the radio link with the SeNB 200S (SCG-RLF). In this case, the UE 100 can transmit the BSR to neither the MeNB 200M nor the SeNB 200S although the UE 100 can communicate with the MeNB 200M. Thus, the UE 100 can transmit data to neither the MeNB 200M nor the SeNB 200S.

To resolve this, if the data amount (PDCP data amount A) accumulated in the PDCP buffer falls below the threshold value and the SeNB 200S is designated as a transmission target of the BSR (and the data), the UE 100 according to the first embodiment autonomously changes the transmission target of the BSR (and the data) from the SeNB 200S to the MeNB 200M, in response to the detection of the SCG-RLF. In other words, the UE 100 transmits the BSR (and the data) to the eNB (MeNB 200M) different from the eNB (SeNB 200S) designated from the MeNB 200M, as a transmission target when the PDCP data amount A is less than the threshold value. As a result, it is possible to transmit the data of the split bearer to the MeNB 200M.

Figure 7:
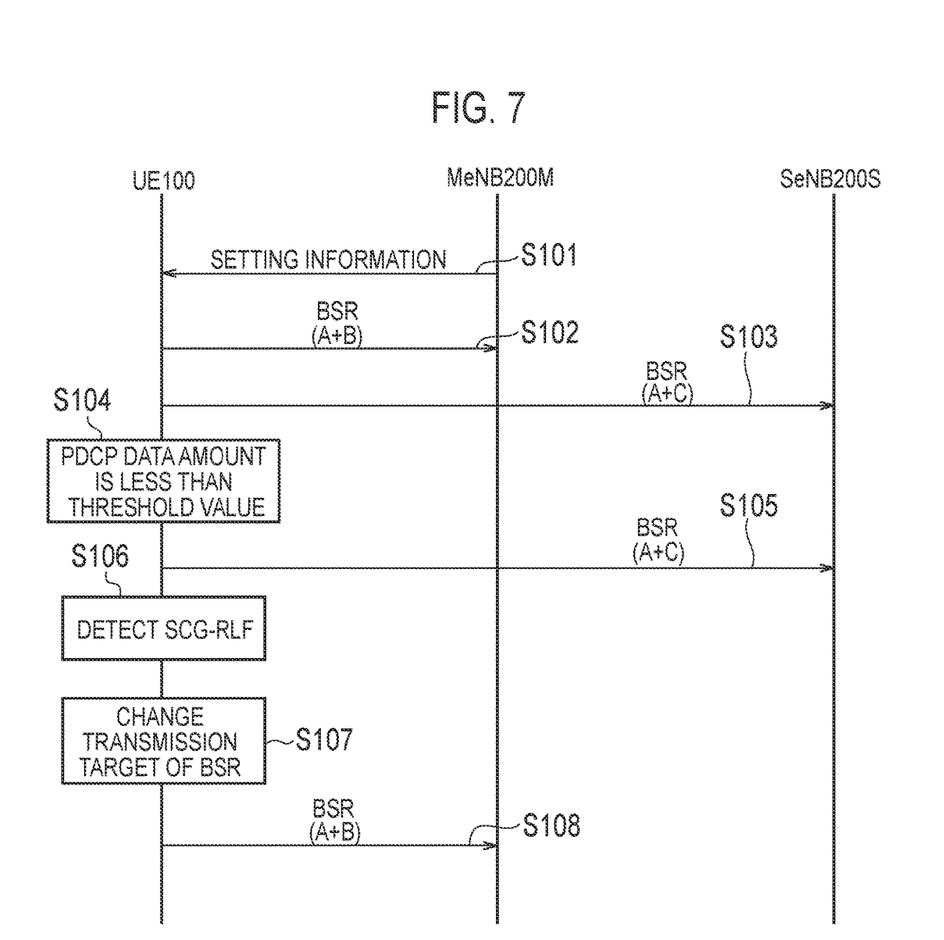
FIG. 7 is a diagram illustrating an example of an operation according to a first embodiment.

FIG. 7 is a diagram illustrating an example of an operation according to the first embodiment.

As illustrated in FIG. 7, in step S101, the MeNB 200M transmits setting information for designating the SeNB 200S as the transmission target of the BSR (and the data) when the PDCP data amount A is less than the threshold value, by an RRC signaling, to the UE 100.

If the PDCP data amount A does not fall below the threshold value, in steps S102 and S103, the UE 100 transmits the BSR to both the MeNB 200M and the SeNB 200S.

If the PDCP data amount A falls below the threshold value (step S104), in step S105, the UE 100 transmits the BSR to the SeNB 200S only. It is noted that the case where the PDCP data amount A falls below the threshold value includes both a case where the PDCP data amount A falls below the threshold value after the PDCP data amount A (buffer) once becomes empty and a case where the PDCP data amount A falls below the threshold value after the PDCP data amount A exceeds the threshold value.

In step S106, the UE 100 detects an RLF with the SeNB 200S (SCG-RLF).

In step S107, the UE 100 changes the transmission target of the BSR (and the data) from the SeNB 200S to the MeNB 200M.

In step S108, the UE 100 transmits the BSR to the MeNB 200M.

The UE 100 may transmit an SCG-RLF report about the SCG-RLF to the MeNB 200M, in response to the detection of the SCG-RLF. The MeNB 200M may transmit, based on the SCG-RLF report, an RRC signaling for changing a setting for dual connectivity communication, to the UE 100.

Second Embodiment

A second embodiment will be described while focusing on differences from the first embodiment, below. The second embodiment is an embodiment relating to an operation for the PDCP entity 12 to hand over the PDCP PDU to the RLC entity (RLC entity 22 or 23).

The UE 100 according to the second embodiment transmits data of a plurality of bearers to the two eNBs 200 (the MeNB 200M and the SeNB 200S). The plurality of bearers include at least one split bearer. The UE 100 includes a controller 130 including two RLC entities 22 and 23 corresponding to the two eNBs 200 and a PDCP entity 12 located at a higher layer than the two RLC entities 22 and 23. The PDCP entity 12 performs apriority setting on the plurality of bearers. The PDCP entity 12 preferentially delivers data of a bearer with a higher priority, to the RLC entity corresponding to one eNB 200, if an uplink radio resource is allocated to the UE 100 from the one eNB 200 out of the two eNBs 200. It is noted that the PDCP entity 12 may perform a priority setting on the plurality of bearers, according to a notification about the priority setting to the plurality of bearers from the MAC entity. In this case, the MAC entity performs the priority setting on the plurality of bearers.

(Push Model and Pull Model)

The PDCP entity 12 performs a process on a PDCP SDU received from the higher layer and then hands it over, as a PDCP PDU, to any RLC entity (RLC entity 22 or 23). A method of delivering may include two types of methods, that is, a Push model and a Pull model.

The Push model is an instantaneous type-scheme in which the PDCP PDU is delivered even if there is no uplink radio resource allocation. The PDCP entity 12 creates a PDCP PDU upon receiving the PDCP SDU, and delivers the PDCP PDU to any RLC entity.

On the other hand, the Pull model is a buffer accumulation type-scheme in which a PDCP PDU is delivered depending on an uplink radio resource allocation. The PDCP entity 12 does not hand over a PDCP PDU upon receiving a PDCP SDU, but once accumulates it into the PDCP buffer. The PDCP entity 12 delivers the PDCP PDU by an allocated resource, to a corresponding PDCP entity, in response to reception of resource allocation information (UL grant).

Operation According to Second Embodiment

There occurs a problem about the priority among bearers, if the Pull model is adopted. For example, it is assumed that a split bearer #1 and a split bearer #2 are set to the UE 100.

If the Pull model is adopted, the PDCP entity 12 of the UE 100 accumulates data of the split bearer #1 and data of the split bearer #2, into the PDCP buffer. Here, it is assumed that the PDCP entity 12 accumulates 100 kBytes of data for the split bearer #1, into the PDCP buffer, and accumulates 200 kBytes of data for the split bearer #2, into the PDCP buffer. In such a circumstance, if the SeNB 200S allocates 50 kBytes of resources, it is not obvious how the PDCP entity 12 delivers the PDCP PDU to the RLC entity 23.

Therefore, the PDCP entity 12 of the UE 100 according to the second embodiment performs a priority setting on the plurality of bearers (the split bearers #1 and #2).

Figure 8:
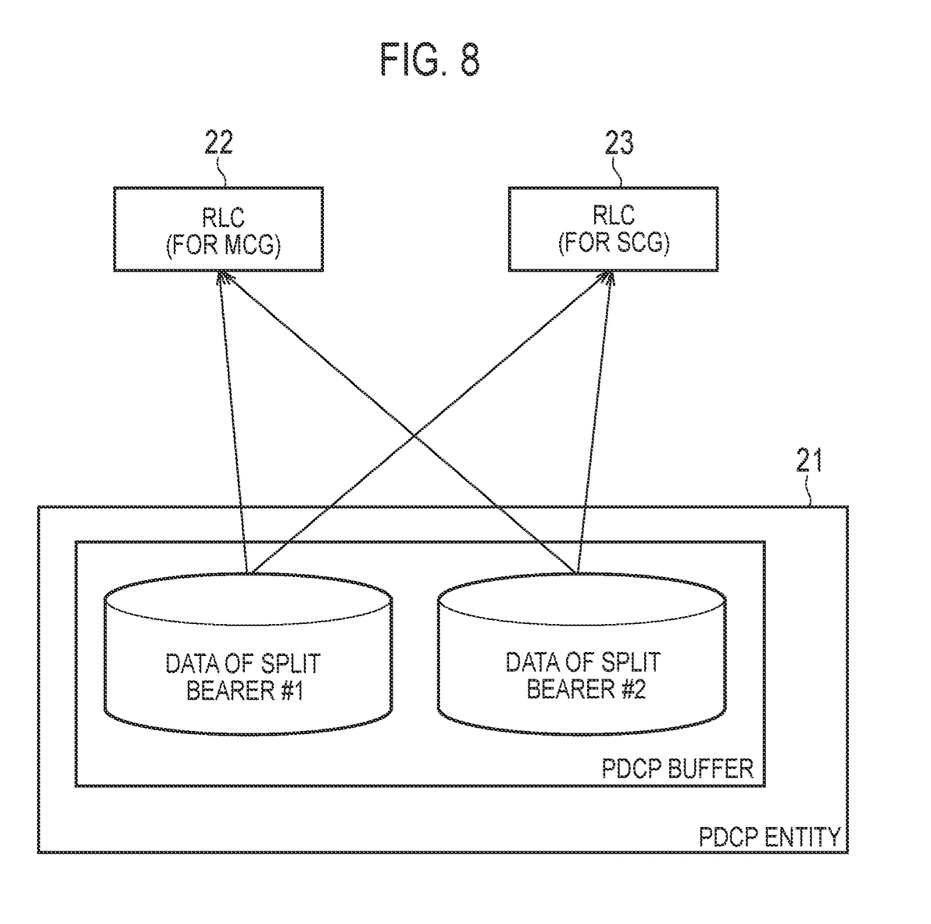
FIG. 8 is a diagram illustrating an example of an operation according to a second embodiment.

FIG. 8 is a diagram illustrating an example of an operation according to the second embodiment.

As illustrated in FIG. 8, the PDCP entity 12 sets a priority to each of the split bearers #1 and #2. The PDCP entity 12 preferentially delivers data of a bearer with a higher priority, to the RLC entity corresponding to one eNB 200, if an uplink radio resource is allocated to the UE 100 from the one eNB 200 out of the two eNBs 200. For example, the PDCP entity 12 preferentially delivers the data of a bearer with a higher priority, to the RLC 22 entity for MCG, if an uplink radio resource is allocated from the MeNB 200M. On the other hand, the PDCP entity 12 preferentially delivers the data of a bearer with a higher priority, to the RLC entity 23 for SCG, if an uplink radio resource is allocated from the SeNB 200S.

As a result, even if the Pull model is adopted, the PDCP entity 12 can appropriately hand over the PDCP PDU to the RLC entity. A specific example of performing a priority setting between the split bearers will be described, below.

(1) Priority Setting Pattern 1

In the priority setting pattern 1 of the second embodiment, the PDCP entity 12 performs a priority setting, based on a setting parameter notified from the MeNB 200M. The setting parameter is notified by an RRC signaling from the MeNB 200M to the UE 100, for example.

The setting parameter includes priority, Prioritized BitRate, bucketSizeDuration, or the like. Here, an example will be described where the PDCP entity 12 performs an operation of performing a priority setting on the plurality of split bearers.

Step 0: the PDCP entity 12 maintains a variable Bj for each split bearer. To an initial value of the variable Bj, zero is set, and the PDCP entity 12 increases the variable Bj by PBR×TTI for each TTI. Here, the PBR indicates Prioritized BitRate of the split bearer j. Further, the variable Bj is not allowed to exceed a bucket size set to each split bearer. The bucket size is evaluated by PBR×BSD. Here, the BSD indicates Bucket Size Duration.

Step 1: the PDCP entity 12 applies a resource to data of all split bearers where Bj>0 stands (that is, delivers the PDCP PDU). An order of the bearers delivering the PDCP PDU is set to the order of priority.

Step 2: the PDCP entity 12 subtracts a value from the variable Bj by the allocated resources, for each split bearer. For example, the PDCP entity 12 subtracts 10 kBytes from Bj upon creating 10 kBytes of PDCP PDU.

Step 3: if there is still a remnant of a transmittable resources after the above operation is performed, the PDCP entity 12 performs again resource allocation until the transmittable resources is not available any more (that is, delivers the PDCP PDU). At this time, the allocation is performed in the order of priority.

(2) Priority Setting Pattern 2

In the second embodiment, the PDCP entity 12 performs the priority setting, based on the data amount (PDCP data amount) for each bearer accumulated in the buffer (PDCP buffer) of the PDCP entity 12.

For example, the PDCP entity 12 applies a higher priority to a split bearer having the PDCP data amount less than a threshold value, that is, a split bearer transmitting a BSR to only one eNB. Specifically, the PDCP entity 12 sets a higher priority to a split bearer having a PDCP data amount less than a threshold value, than a split bearer having the PDCP data amount exceeding the threshold value.

Alternatively, the PDCP entity 12 applies a higher priority to a split bearer having a large PDCP data amount. On the other hand, the PDCP entity 12 applies a lower priority to a split bearer having a small PDCP data amount.

(3) Priority Setting Pattern 3

In the second embodiment, the PDCP entity 12 performs the priority setting, based on the priority applied to a logical channel corresponding to each of the plurality of split bearers.

For example, the PDCP entity 12 acquires the priority of a logical channel corresponding to a split bearer from the MAC entities 31 and 32, and applies a higher priority to a split bearer having a higher logical channel priority. On the other hand, the PDCP entity 12 applies a lower priority to a split bearer having a lower logical channel priority.

Alternatively, the PDCP entity 12 may perform the priority setting on a split bearer in accordance with a request performed by the MAC entities 31 and 32 based on the priority of a logical channel. For example, the MAC entities 31 and 32 designates a logical channel with a higher priority, to the PDCP entity 12, and the PDCP entity 12 sets a higher priority to the corresponding split bearer.

(4) Other Priority Setting Patterns

The PDCP entity 12 may perform the priority setting, based on a QCI (Qos Class Identity) corresponding to each of the plurality of split bearers. Specifically, the PDCP entity 12 applies a higher priority to a split bearer having a higher QCI. On the other hand, the PDCP entity 12 applies a lower priority to a split bearer having a lower QCI.

It is noted that the MeNB 200M may select one of the priority setting patterns 1 to 3, and which of the patterns to be used may be set to the UE 100.

Third Embodiment

A third embodiment will be described while focusing on differences from the first embodiment and the second embodiment, below. The third embodiment is an embodiment relating to the above-described "Double BSR".

The UE 100 according to the third embodiment transmits the data of one bearer (split bearer) to the two eNBs 200 (the MeNB 200M and the SeNB 200S). The UE 100 includes a controller 130 including two RLC entities 22 and 23 corresponding to the two eNBs 200 and a PDCP entity 12 located at a higher layer than the two RLC entities 22 and 23. The controller 130 performs a process of transmitting a BSR indicating a total of the data amount accumulated in the buffer (RLC buffer) of the corresponding RLC entity and the data amount accumulated in the buffer (PDCP buffer) of the PDCP entity 12, on at least one of the two eNBs 200. The controller 130 notifies at least one of the two eNBs 200 of predetermined information for determining the data amount accumulated in the buffer (PDCP buffer) of the PDCP entity 12.

Operation According to Third Embodiment

The "Double BSR" has a drawback such as "over-scheduling" in which uplink radio resources equal to or more than those necessary for the transmission data amount held by the UE 100 are allocated. As described above, if the PDCP data amount exceeds a threshold value, the UE 100 reports the PDCP data amount A to both the MeNB 200M and the SeNB 200S. Thus, the MeNB 200M and the SeNB 200S may redundantly allocate an uplink radio resource to the PDCP data amount A. As a result, the "over-scheduling" occurs.

Here, it is important for the eNB 200 side to recognize how much data amount is accumulated in the PDCP buffer and how much data amount is accumulated in the RLC buffer, out of the data amount indicated by the BSR received from the UE 100. For example, if substantially no data is accumulated in the PDCP buffer (that is, in the case of the Push model), each eNB 200 may suffice to allocate an uplink radio resource by the data amount indicated by the BSR received from the UE 100. On the other hand, if most of data is accumulated in the PDCP buffer (that is, in the case of the Pull model), each eNB 200 may suffice to allocate an uplink radio resource equal to or more than half the data amount indicated by the BSR received from the UE 100.

Therefore, the UE 100 according to the third embodiment notifies at least one of the two eNBs 200 of predetermined information for determining the data amount accumulated in the PDCP buffer. The UE 100 may notify only the MeNB 200M of the predetermined information. Alternatively, the UE 100 may notify both the MeNB 200M and the SeNB 200S of the predetermined information. A specific example of the notification of the predetermined information will be described, below.

(1) Notification Pattern 1

In a notification pattern 1 of the third embodiment, the UE 100 notifies, as the predetermined information, information indicating a scheme of delivering, by the PDCP entity 12, the data to the RLC entities 22 and 23. The scheme is one of the buffer accumulation type-scheme (Pull model) in which the data is delivered depending on an uplink radio resource allocation, and the instantaneous type-scheme (Push model) in which the data is delivered even if there is no uplink radio resource allocation.

That is, the UE 100 notifies the eNB 200 of which of the Push model and the Pull model is adopted by the UE 100.

Figure 9:
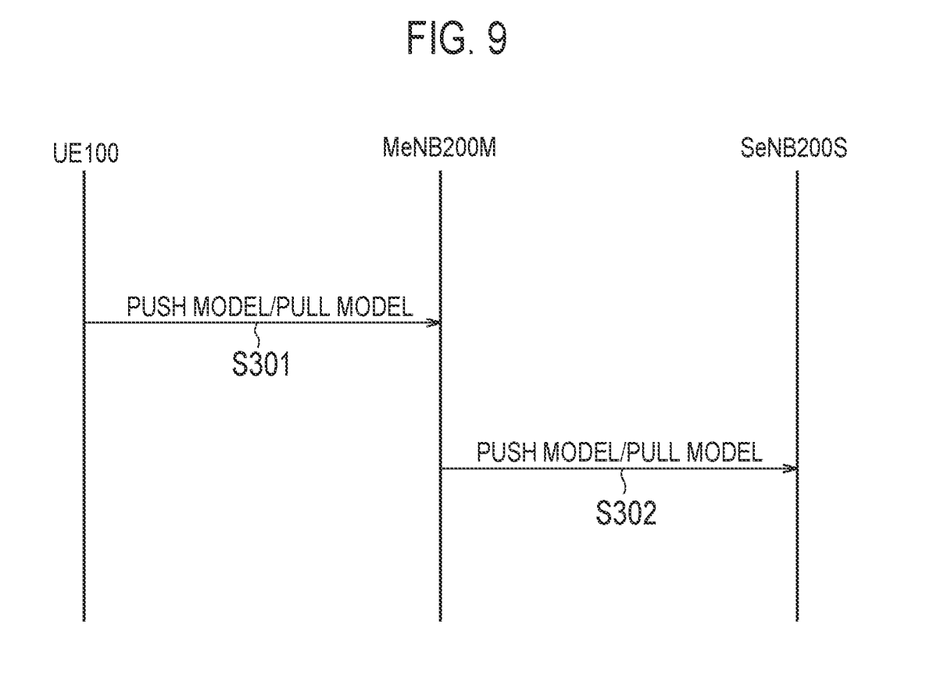
FIG. 9 is a diagram illustrating a notification pattern 1 according to a third embodiment.

FIG. 9 is a diagram illustrating the notification pattern 1 according to the third embodiment.

As illustrated in FIG. 9, in step S301, the UE 100 notifies the MeNB 200M of which of the Push model and the Pull model is adopted by the UE 100. For example, the UE 100 may perform the notification by UE capability (capability notification) that is one type of RRC signaling. Alternatively, the UE 100 may perform the notification by PDCP control PDU that is a PDCP signaling.

In step S302, the MeNB 200M notifies, over the X2 interface, the SeNB 200S of which of the Push model and the Pull model is adopted by the UE 100.

Alternatively, the UE 100 may notify, by a MAC signaling, both the MeNB 200M and the SeNB 200S of which of the Push model and the Pull model is adopted by the UE 100, if the "Double BSR" is triggered (if the PDCP data amount exceeds a threshold value), for example. In this case, a new MAC control element (MACCE) may be defined, and a notification such as Padding BSR may be used in which a redundant amount of the uplink radio resource is used.

(2) Notification Pattern 2

In a notification pattern 2 of the third embodiment, the UE 100 notifies, as the predetermined information, information indicating a ratio between the data amount accumulated in the buffer of the RLC entity and the data amount accumulated in the buffer (PDCP buffer) of the PDCP entity 12. The information is notified by the RRC signaling, the PDCP signaling, or the MAC signaling, similarly to the notification pattern 1.

As illustrated in FIG. 6, the UE 100 notifies the MeNB 200M of the information indicating the ratio between the data amount A and the data amount B. On the other hand, the UE 100 notifies the SeNB 200S of the information indicating the ratio between the data amount A and the data amount C. The notification to the SeNB 200S may be a notification by way of the MeNB 200M, as illustrated in FIG. 9.

(3) Notification Pattern 3

In a notification pattern 3 of the third embodiment, the UE 100 notifies, as the predetermined information, information indicating the data amount accumulated in the PDCP buffer (PDCP data amount A). The information is notified by the RRC signaling, the PDCP signaling, or the MAC signaling, similarly to the notification pattern 1. The notification to the SeNB 200S may be a notification by way of the MeNB 200M, as illustrated in FIG. 9.

Modification of Third Embodiment

The UE 100 according to a modification of the third embodiment transmits a BSR, in response to a trigger that the data amount accumulated in the PDCP buffer (PDCP data amount A) falls below a predetermined amount. The PDCP data amount A falling below the predetermined amount may be the PDCP data amount A becoming zero. A BSR transmitted by such a new trigger may be a special BSR (Truncated BSR, for example). The special BSR may preferably include a buffer state (BS) of a logical channel group (LCG) including a logical channel corresponding to a bearer having the PDCP data amount A falling below the predetermined amount.

According to the modification of the third embodiment, when the new trigger is introduced, each eNB 200 can estimate, based on the BSR, that the PDCP data amount A of the UE 100 falls below the predetermined amount.

Fourth Embodiment

A fourth embodiment will be described with a focus on a difference from the first embodiment to the third embodiment, below. The fourth embodiment is an embodiment relating to the above-described "Double BSR"

The UE 100 according to the fourth embodiment transmits the data of one bearer (split bearer) to the two eNBs 200 (the MeNB 200M and the SeNB 200S). The UE 100 includes a controller 130 including two RLC entities 22 and 23 corresponding to the two eNBs 200 and a PDCP entity 12 located at a higher layer than the two RLC entities 22 and 23. The controller 130 performs a process of transmitting a BSR indicating a total of the data amount accumulated in the buffer (RLC buffer) of the corresponding RLC entity and the data amount accumulated in the buffer (PDCP buffer) of the PDCP entity 12, on each of the two eNBs 200. The controller 130 notifies at least one of the two eNBs 200 of information indicating that there is no data to be transmitted, if there is no data to be transmitted for the split bearer.

Operation According to Fourth Embodiment

As a result of the over-scheduling due to the "Double BSR", a redundant uplink radio resource may be allocated to the UE 100 that already completes data transmission. This leads to a wasteful use of the uplink radio resource.

Therefore, the UE 100 according to the fourth embodiment notifies at least one of the two eNBs 200 of information indicating that there is no data to be transmitted, if there is no data to be transmitted for the split bearer.

The UE 100 notifies information (End marker) explicitly indicating that there is no data to be transmitted, when transmitting the last data to any one of the two eNBs 200. Alternatively, the UE 100 notifies the information (End marker) explicitly indicating that there is no data to be transmitted even if not receiving transmission acknowledge information (ACK/NACK) corresponding to the last data after transmitting the last data to any one of the two eNBs 200. The eNB 200 that has received such an End marker can cancel allocation of an uplink radio resource to the UE 100.

The UE 100 uses a radio resource (PUSCH resource, for example) different from a radio resource (PUCCH resource) to be allocated for data transmission after transmitting the last data to any one of the two eNBs 200 to notify the information indicating that there is no data to be transmitted. The eNB 200 that has received the information can cancel allocation of an uplink radio resource (PUSCH resource) to the UE 100.

Modification of Fourth Embodiment

In a modification of the fourth embodiment, the eNB 200 may determine that a transmittable data remaining amount of the UE 100 is about to be empty soon, based on "Padding BSR" or Null data transmitted by the UE 100 by using a redundant amount of the allocated radio resource, and reflect the determination on the allocation of the uplink radio resource.

Other Embodiments

Each of the above-described embodiments may be performed individually and may also be performed by combining two or more of the embodiments.

In each of the above-described embodiments, an example where the MeNB 200M (master base station) corresponds to the first radio communication apparatus and the SeNB 200S (secondary base station) corresponds to the second radio communication apparatus has been described. However, each of the above-described embodiments may be applied to dual connectivity communication between an eNB and a WLAN node (LTE and WLAN aggregation). In the LTE and WLAN aggregation, the UE 100 simultaneously performs communication with an eNB and that with a WLAN node. In each of the above-described embodiments, the "MeNB 200M" may be replaced with the "eNB" in the LTE and WLAN aggregation and the SeNB 200M may be replaced with the "WLAN node" in the LTE and WLAN aggregation. The WLAN node includes a WLAN access point (AP). The WLAN node may include a WLAN access controller (AC).

In each embodiment described above, the LTE system has been exemplified as the mobile communication system. However, the present invention is not limited to the LTE system. The present invention may be applied to a mobile communication system other than the LTE system.

APPENDIX

1. Introduction

Currently, it is up to UE implementation how PDCP delivers PDUs to the lower layer. However, with two data paths for the uplink direction, the delivery of PDCP PDUs to the multiple lower layers is unclear, and further clarification of the principle behind PDCP PDUs delivery is needed.

2. Discussion

Before Rel-13, it could be completely up to UE implementation when PDCP delivers PDCP PDU to lower layer. Some companies may assume that PDCP PDUs are delivered to lower layer immediately upon arrival of PDCP SDU. It makes sense that PDCP processes PDCP SDU immediately since ciphering should not be delay-critical operation. Furthermore, delivering PDCP PDUs to lower layer and storing it in RLC transmission buffer would not require additional PDCP PDU buffer.

Figure 10:
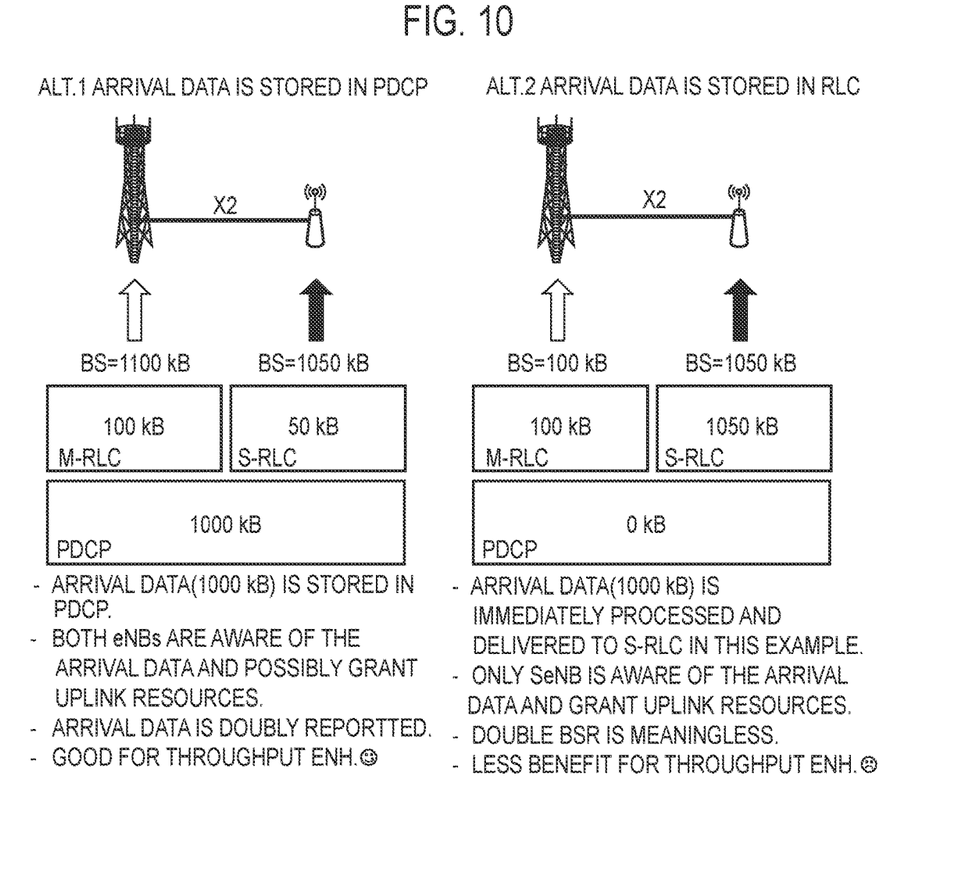
FIG. 10 is a diagram illustrating a method of storing incoming data according to a note.

However, this model does not work well for uplink split bearer operation. It agreed to specify double BSR when the data amount in PDCP is larger than the configured threshold. This makes it possible for both eNBs to be aware of the UE's available PDCP data for transmission and each eNB may grant uplink resources as appropriate (e.g., based on eNB coordination). If PDCP delivers its PDUs to lower layers blindly, each reported buffer status would be based on each RLC buffer status, i.e. SeNB and MeNB will only obtain from the UE the SCG-RLC buffer status and MCG-RLC buffer status, respectively (FIG. 10). For throughput enhancement in uplink and for reducing the amount of over-allocation of UL resources, PDCP data should be stored in PDCP layer until uplink resources are granted.

Proposal 1: RAN2 should confirm that arrival data is stored in PDCP until uplink resources are granted for throughput enhancement in the uplink.

If proposal 1 is agreeable, there are two ways to achieve this behavior.

1. PDCP SDUs are stored in PDCP SDU buffer. When PDCP is indicated uplink grant, it starts processing the SDUs and delivers processed PDUs to the RLC layer.

2. PDCP SDUs are immediately processed, and the processed PDCP PDUs are stored in PDCP PDU buffer. When PDCP is indicated uplink grant, it delivers the stored PDUs to the RLC layer.

Although the second way has the advantage that ciphering delay is eliminated, RAN2 does not have any reason to specify which way is selected. So, when PDCP SDU should be processed and whether PDCP PDU buffer is installed can still be up to UE implementation.

Proposal 2: It can still be up to UE implementation when PDCP SDU should be processed and whether PDCP PDU buffer is installed.

3. Conclusion

This appendix discusses how the UE should process the PDCP arrival data and when the processed PDCP PDUs should be delivered to the lower layer. Through this discussion, we reached the following proposals.

Proposal 1: RAN2 should confirm that arrival data is stored in PDCP until uplink resources are granted for throughput enhancement in the uplink.

Proposal 2: It can still be up to UE implementation when PDCP SDU should be processed and whether PDCP PDU buffer is installed.

The entire contents of U.S. Provisional Application No. 62/198,937 (filed Jul. 30, 2015) are incorporated herein by reference.

INDUSTRIAL APPLICABILITY

The present invention is useful in the mobile communication field.

The invention claimed is:

1. A radio terminal configured to perform dual connectivity communication with a master base station and a secondary base station, comprising:
    a transmitter configured to transmit data of one bearer to the master and secondary base stations; and
    a controller including two transmission entities corresponding to the master and secondary base stations respectively and a higher entity located at a layer higher than a layer of the two transmission entities, wherein
    the controller is configured to perform a process of transmitting a buffer status report including information indicating a total data amount, to at least one of the master or secondary base stations,
    the total data amount includes a first data amount accumulated in a buffer of the transmission entity corresponding to the at least one of the master or secondary base stations and a second data amount accumulated in a buffer of the higher entity, and
    the controller is configured to notify the at least one of the master or secondary base stations of predetermined information for determining the second data amount accumulated in the buffer of the higher entity.

2. The radio terminal according to claim 1, wherein
    the controller is configured to notify, as the predetermined information, information indicating a scheme of delivering the data to any one of the transmission entities by the higher entity, and
    the scheme is one of a buffer accumulation type-scheme in which the data is delivered depending on an uplink radio resource allocation, and an instantaneous type-scheme in which the data is delivered even if there is no uplink radio resource allocation.

3. The radio terminal according to claim 1, wherein
    the controller is configured to notify, as the predetermined information, information indicating a ratio between the first data amount and the second data amount.

4. The radio terminal according to claim 1, wherein
    the controller is configured to notify, as the predetermined information, information indicating the second data amount accumulated in the buffer of the higher entity.

5. A radio terminal configured to perform dual connectivity communication with a master base station and a secondary base station, comprising:
    a transmitter configured to transmit data of one bearer to the master and secondary base stations; and
    a controller including two transmission entities corresponding to the master and secondary base stations respectively and a higher entity located at a layer higher than a layer of the two transmission entities, wherein
    the controller is configured to perform a process of transmitting a buffer status report including information indicating a total data amount, to each of the master and secondary base stations,
    the total data amount includes a first data amount accumulated in a buffer of the corresponding transmission entity and a second data amount accumulated in a buffer of the higher entity, and
    the controller is configured to transmit the buffer status report in response to a trigger that the second data amount accumulated in the buffer of the higher entity falls below a predetermined amount.

6. A radio terminal configured to perform dual connectivity communication with a master base station and a secondary base station, comprising:
    a transmitter configured to transmit data of one bearer to the master and secondary base stations; and
    a controller including two transmission entities corresponding to the master and secondary base stations respectively and a higher entity located at a layer higher than a layer of the two transmission entities, wherein
    the controller is configured to perform a process of transmitting a buffer status report including information indicating a total data amount, to each of the master and secondary base stations,
    the total data amount includes a first data amount accumulated in a buffer of the corresponding transmission entity and a second data amount accumulated in a buffer of the higher entity, and
    the controller is configured to notify at least one of the master or secondary base stations of information indicating that there is no data to be transmitted, if there is no data to be transmitted for the bearer.

7. The radio terminal according to claim 6, wherein
    the controller is configured to
    during transmitting last data to any one of the master and secondary base stations or after transmitting the last data, even if not receiving transmission acknowledge information corresponding to the last data, notify information indicating that there is no data to be transmitted.

8. The radio terminal according to claim 6, wherein
    the controller is configured to
    after transmitting last data to any one of the master and secondary base stations, use a radio resource different from a radio resource allocated for data transmission to notify information indicating that there is no data to be transmitted.

* * * * *